J. E. COX.
FISH TRIMMING MACHINE.
APPLICATION FILED JULY 17, 1919.
1,377,465.
Patented May 10, 1921.
2 SHEETS—SHEET 1.
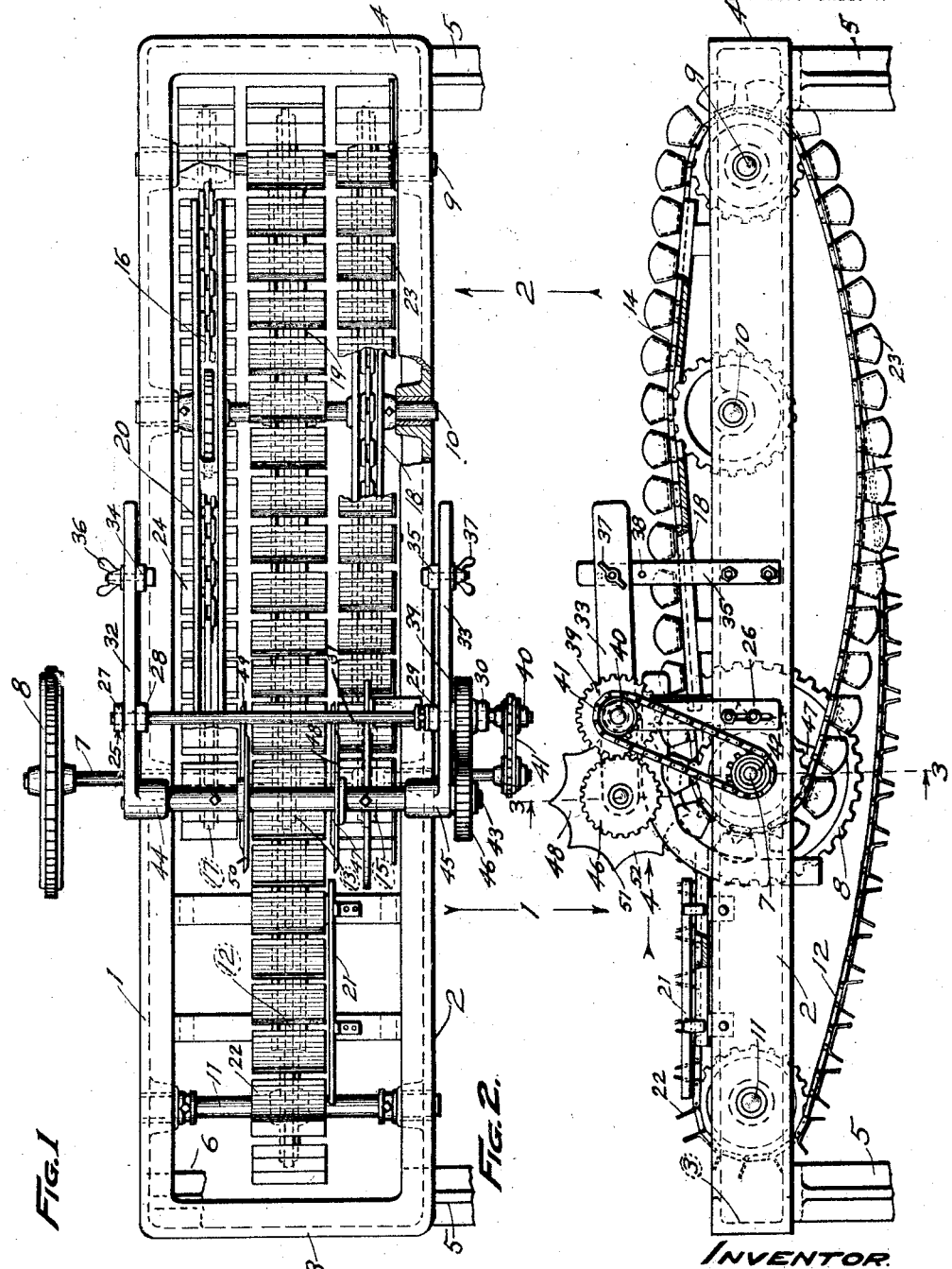
INVENTOR.
JOHN EDGAR COX.
BY Hazard & Miller
ATTORNEYS.

J. E. COX.
FISH TRIMMING MACHINE.
APPLICATION FILED JULY 17, 1919.
1,377,465.
Patented May 10, 1921.
2 SHEETS—SHEET 2.
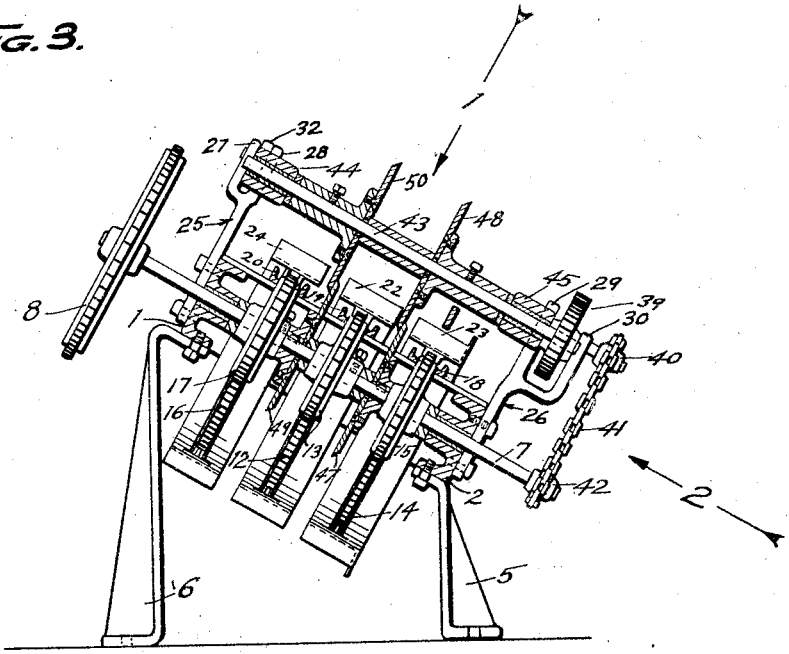
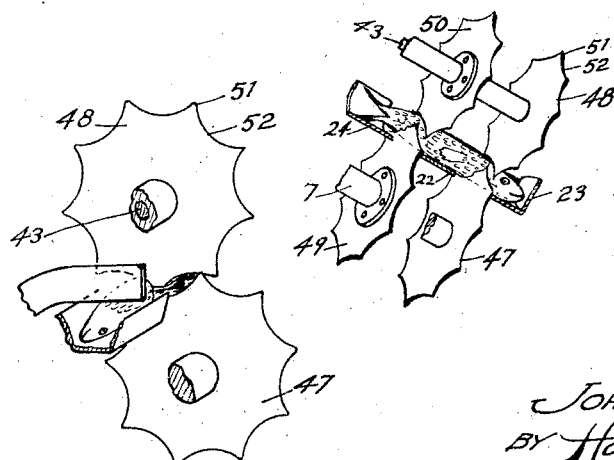
INVENTOR.
JOHN EDGAR COX.
BY Hazard & Miller
ATTORNEYS.

UNITED STATES PATENT OFFICE.

JOHN E. COX, OF EAST SAN PEDRO, CALIFORNIA.

FISH-TRIMMING MACHINE.

1,377,465.  Specification of Letters Patent.  Patented May 10, 1921.

Application filed July 17, 1919. Serial No. 311,603.

*To all whom it may concern:*

Be it known that I, JOHN EDGAR COX, a citizen of the United States, residing at East San Pedro, in the county of Los Angeles and State of California, have invented new and useful Improvements in Fish-Trimming Machines, of which the following is a specification.

My object is to make a fish trimming machine, and my invention consists of the novel features herein shown, described and claimed.

Specifically my object is to make a machine which will cut the heads and tails from fish leaving the bodies of a uniform length.

Figure 1 is a top plan view of a fish trimming machine embodying the principles of my invention, the view being taken looking in the direction indicated by the arrows 1 in Figs. 2 and 3.

Fig. 2 is a side elevation looking in the direction indicated by the arrows 2 in Figs. 1 and 3.

Fig. 3 is a vertical cross section on the line 3—3 of Fig. 2.

Fig. 4 is a fragmentary perspective illustrating the operation of cutting the head and tail from the body of a fish.

Fig. 5 is a fragmentary perspective illustrating the operation of partially cutting the head and removing the entrails from the body with the head.

The side bars 1 and 2 are rigidly connected by the end bars 3 and 4 to make a rectangular rigid frame. The frame is mounted on legs 5 connected to the side bar 2 and legs 6 connected to the side bar 3, the legs 6 being longer than the legs 5, so as to mount the frame at an angle of about 30° relative to a horizontal plane.

A driving shaft 7 is mounted through the side bars 2 and 3 near the longitudinal center, and a driving sprocket 8 is fixed upon one end of the shaft 7. An idler shaft 9 is mounted through the forward ends of the side bars 1 and 2. A second idler shaft 10 is mounted through the side bars 1 and 2 half way between the shaft 7 and the shaft 9, and a third idler shaft 11 is mounted through the rear ends of the side bars 1 and 2.

The body conveying chain 12 runs over a driving sprocket 13 fixed upon the center of the shaft 7 and over idler sprockets fixed upon the shafts 9, 10 and 11. The head conveying chain 14 runs over a driving sprocket 15 fixed upon the shaft 7 and over idler sprockets fixed upon the shafts 9 and 10.

In a like manner the tail conveying chain 16 runs over a driving sprocket 17 fixed upon the shaft 7 and over idler sprockets upon the shafts 9 and 10. The chains 12, 14 and 16 run in channel iron guideways 18, 19 and 20 to hold the chains from sagging and to hold the chains from moving sidewise.

A bar 21 is mounted along the lower side of the body conveyer of which the chain 12 is a part and between the cutters and the discharge end of the conveyer to prevent the bodies from sliding endwise from the conveyer. The body conveyer pans 22 are secured to the conveyer chain 12 and are open at both ends and adapted to receive a single fish body.

The head conveyer pans 23 are secured to the chain 14 and are similar to the pans 22 except that they are closed at their outer ends to prevent the heads from sliding out of the pans endwise. The tail conveyer pans 24 are secured to the chain 16 and are similar to the body conveyer pans. The chain 14 carrying the pans 23 is on the lower side of the chain 12 carrying the pans 22, and the chain 16 carrying the pans 24 is on the upper side of the body conveyer.

Brackets 25 and 26 extend upwardly from the side bars 1 and 2. The bracket 25 has bearings 27 and 28 in its upper end, and the bracket 26 has bearings 29 and 30 in its upper end. The countershaft 31 is mounted in the bearings 27, 28, 29 and 30. The levers 32 and 33 are pivotally mounted upon the shaft 31, the lever 32 being between the bearings 27 and 28, and the lever 33 being between the bearings 29 and 30. Posts 34 and 35 extend upwardly from the side bars 1 and 2, and thumb screws 36 and 37 are inserted through the levers 32 and 33 and into holes 38 in the posts, so that by moving the thumb screws from one hole to another the levers may be tilted as desired and held in their adjusted positions.

A spur gear 39 is fixed upon the shaft 31. A sprocket 40 is fixed upon the shaft 31. A chain 41 connects the sprocket 40 to a sprocket 42 fixed upon the shaft 7. The cutter shaft 43 is mounted in bearings 44 and 45 in the ends of the levers 32 and 33, and a spur gear 46 is fixed upon the end of the shaft 43 in mesh with the spur gear 39, The lower head cutter 47 is fixed upon the shaft 7, and the upper head cutter 48 is fixed upon the shaft 43. The lower tail cutter 49 is fixed upon the shaft 7, and the upper tail cutter 50 is fixed upon the shaft 43. The cutters 47 and 48 operate between the pans 22 and 23, and the cutters 49 and 50 operate between the pans 22 and 24.

The cutters 47, 48, 49 and 50 are substantially alike and each cutter has points 51 and concavities 52 between the points, the points 51 and the concavities 52 forming overlapping cutting edges, so that the points overlap more than the concavities.

Attention is called to the fact that the head conveyer pans 23 and the tail conveyer pans 24 travel forwardly around the shaft 7 while the body conveyer pans 22 travel still farther forwardly around the shaft 11. The upper cutters 48 and 50 upon the shaft 43 are set somewhat in front of the lower cutters 47 and 49 upon the shaft 7, and the upper cutters are raised or lowered by manipulating the thumb screws 36 and 37 and the levers 32 and 33.

In the practical operation the fish are placed one at a time in the conveyer pans with the bodies of the fish in the pans 22, the heads extending into the pans 23, and the tails extending into the pans 24. The conveyers operate continuously at a comparatively slow speed, and as the fish pass the cutters the cutters are timed relative to the pans and relative to each other, so that the fish will pass into the concavities 52, and when the cutters come toward each other on opposite sides of the fish the first action of the cutters is to cut the case of the fish to sever the head from the body without cutting through the entrails, and at this time the pan 23 carrying the head moves downwardly relative to the pan 22 carrying the body and will pull the entrails from the body with the head.

Various changes may be made without departing from the spirit of my invention as claimed.

I claim:

1. A fish trimming machine comprising a body conveyer, a driving shaft intermediate of the ends of the body conveyer, a driving sprocket fixed upon the shaft and driving the body conveyer, a head conveyer on one side of the body conveyer and operated by the driving shaft, a tail conveyer on the other side of the body conveyer and operated by the driving shaft, the head and tail conveyers passing around the driving shaft and the body conveyer passing forwardly around an idler shaft, lower cutters fixed upon the driving shaft, an adjustable shaft above and behind the driving shaft, upper cutters upon the adjustable shaft, and means for driving the upper cutters from the driving shaft.

2. In a fish trimming machine, a rotary cutter comprising two shafts mounted parallel, cutting elements fixed upon the shafts and overlapping, said cutting elements having points and concavities between the points, and said cutting elements being set to bring the points together and the concavities together in opposition to each other.

3. A fish trimming machine including three parallel conveyers arranged transversely at an angle, pans on each of the conveyers to receive the fish, the pans on the intermediate conveyer registering with the pans on the uppermost and lowermost conveyers, the pans on the intermediate and uppermost conveyer being open at their ends, the pans on the lowermost conveyer being closed at their lower ends, a cutter between the intermediate conveyer and the lowermost conveyer, and a cutter between said intermediate conveyer and the uppermost conveyer.

4. A fish trimming machine including three parallel conveyers arranged transversely at an angle, pans on each of the conveyers to receive the fish, the pans on the intermediate conveyer registering with the pans on the uppermost and lowermost conveyer, the pans on the intermediate and uppermost conveyer being open at their ends, the pans on the lowermost conveyer being closed at their lower end, a cutter between the intermediate conveyer and the lowermost conveyer, and a cutter between said intermediate conveyer and the uppermost conveyer, the intermediate conveyer extending beyond the end of said uppermost and said lowermost conveyer, and a guide bar mounted adjacent the lower end of the pans of said intermediate conveyer beyond said cutters.

5. In a fish trimming machine, a rotary cutter comprising two shafts mounted parallel, cutting elements fixed upon the shafts and overlapping, said cutting elements having points and concavities between the points, said cutting elements being set to bring the points together and the concavities together in opposition to each other, and means for rotating said cutting elements in opposite directions.

In testimony whereof I have signed my name to this specification.

J. E. COX.